Figure 1:
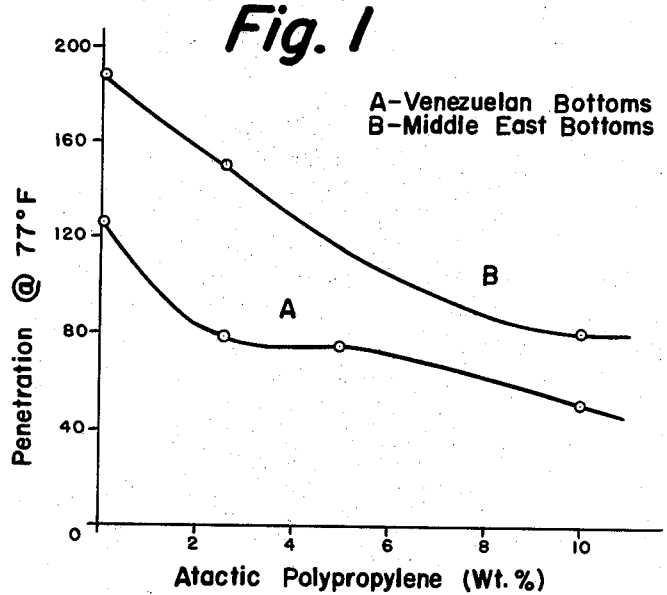

United States Patent Office 3,144,423
Patented Aug. 11, 1964

3,144,423
ASPHALT COMPOSITION CONTAINING ATACTIC POLYPROPYLENE
Steven G. Belak, Claymont, and William J. Stout, Wilmington, Del., assignors to Sun Oil Company, Philadelphia, Pa., a corporation of New Jersey
Filed Aug. 29, 1960, Ser. No. 52,677
6 Claims. (Cl. 260—28.5)

This invention relates to asphalt compositions and particularly to paving asphalts containing a small but effective amount of atactic polypropylene. Paving grade asphalt is made from residuum stocks originating with such crudes as Mid-Continent, Wyoming, West Texas, Mexican, Middle East and Venezuelan. At the present time, the majority of asphalt crudes are treated by either of the two processes, i.e., straight vacuum reduction and vacuum reduction followed by air blowing to produce suitable residuum. The method used is dependent on the source and nature of the crude. For example, most Venezuelan crudes are treated by vacuum distillation alone whereas Middle East crudes generally require vacuum distillation followed by an air blowing treatment.

State and federal governments have derived paving asphalt specifications which must be met where the material is to be used in public road building programs. The requirements vary in the different jurisdictions but all require a certain specification to be met for penetration. In the broadest sense, paving asphalt may have a penetration range of 40 to 300 but the great majority of asphalt paving put down has a penetration of 70 to 120 at 77° F. Over 40% of the asphalt used in the Middle Atlantic States is 85/100 penetration grade. This means that the penetration at 77° F. must fall within the range of 85 to 100.

The penetration test determines the hardness or softness of the material. "Degrees penetration" means the distance (in $\frac{1}{100}$ of a centimeter) a standard needle will penetrate into the asphalt when loaded to 100 grams for five seconds at 77° F. Penetration is also measured at 39.2° F. with a 200 gram weight and a time of 60 seconds. These tests are made according to ASTM procedure. Penetration ratio is $$\frac{\text{Pen. } 39.2° \text{ F.}}{\text{Pen. } 77° \text{ F.}}$$

and is multiplied by 100 to express the value as a percentage.

It is necessary to exercise very careful control in the reduction of crude to a certain percentage residual bottoms and in air blowing to meet these paving grade specifications.

It is the object of this invention to provide a means of meeting specifications in a simple manner.

A more particular object of the invention is to provide a means of achieving a penetration in the range of 70 to 120 at 77° F. together with a penetration ratio of 30.0 or greater by the addition of a small amount of a polymer.

According to the present invention, paving grade asphalt specifications are met by blending atactic polypropylene with the asphalt.

At the present time, no satisfactory commercial use has been found for atactic (essentially non-crystalline) polypropylene formed during the stereo-specific polymerization of propylene. The polymerization takes place in the presence of a catalyst comprising a coordination complex of a transition metal halide with an organometallic compound. The atactic polypropylene represents from about 5 to about 15% by weight of the polymerization product, the remainder being crystalline or isotactic polypropylene. The atactic polymer has a molecular weight of from about 10,000 to about 40,000, more particularly from about 17,000 to about 25,000. It is soluble in boiling pentane, hexane, heptane and other hydrocarbons.

In one known process, the polymerization product in the heptane reaction medium is contacted with a solvent consisting of methanol and water to kill the catalyst. The catalyst is then removed in solution leaving behind a heptane slurry. The atactic polypropylene is in solution in the heptane and this solution is removed from the isotactic polymer. The solution is distilled to recover the heptane solvent which is recycled. The material which remains is the atactic polypropylene employed in the composition of this invention.

The amount of atactic polypropylene mixed with the asphalt is small, preferably in the range of from 1 to about 20% by weight. Any suitable mixing method can be used which results in good distribution of the polymer in the asphalt.

Figure 2:
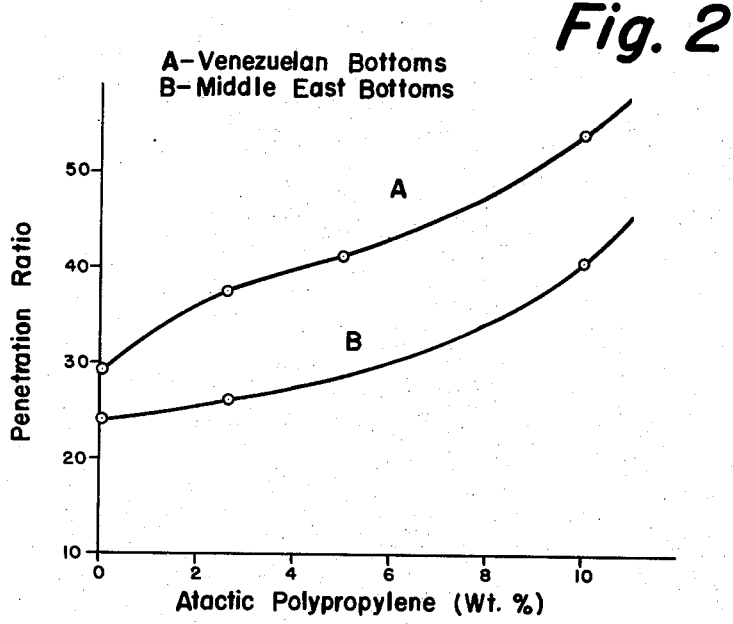

The invention will be more readily understood by referring to the drawings and the data shown below. FIGURE 1 is a plot showing the effect of the addition of atactic polypropylene on the penetration at 77° F. FIGURE 2 is a plot showing the effect of the addition of atactic polypropylene on penetration ratio.

Table I below demonstrates the result of adding up to 10% polymer to Lagomedio (Venezuelan) bottoms.

*Table I*

| | | | | |
|---|---|---|---|---|
| 17.8% Lagomedio Btms., Wt. percent | 100 | 97½ | 95 | 90 |
| Atactic Polypropylene, Wt. percent | 0 | 2½ | 5 | 10 |
| Penetration @ 39.2° F | 36 | 29 | 30 | 28 |
| Penetration @ 77° F | 126 | 79 | 74 | 52 |
| Pen-Ratio (39.2° F./77° F.) × 100 | 29 | 37 | 41 | 54 |

Referring to Curve A in FIGURE 1, it can be seen that the addition of about 2% atactic polypropylene brings the penetration to a value of 85. Thus, the 85/100 specification is easily met by the addition of a small amount of polymer. Referring to Curve A in FIGURE 2, it can be seen that the addition of a small amount of polymer brings the penetration ratio to above 30. The State of New York requires that the penetration ratio be at least 30.

Table II shows the effect of atactic polypropylene on a Middle East residuum which was not subjected to the usual blowing treatment and shows that the blowing step may be omitted.

*Table II*

| | | | |
|---|---|---|---|
| Middle East Btms., Wt. percent | 100 | 97½ | 90 |
| Atactic Polypropylene, Wt. percent | 0 | 2½ | 10 |
| Penetration @ 39.2° F | 45 | 39 | 29 |
| Penetration @ 77° F | 187 | 149 | 80 |
| Pen-Ratio | 24 | 26 | 41 |

Thus, it can be seen that the addition of about 10 weight percent polymer brings the penetration at 77° F. into the desired 85/100 range and brings the penetration ratio to over 30. Curve B in FIGURES 1 and 2 is a plot of the data.

It is believed that atactic polypropylene can be used in conjunction with any crude residuum which is difficult to bring to paving grade specifications.

While the invention has been described primarily with reference to asphalts for use in paving, the composition of the present invention may find equal utility where asphalt having particular penetration characteristics is required. For example, soil stabilization, protection of banks and canals by asphalt linings, pipe coating and coating of metals which are to be buried in soil, and moulded articles such as battery boxes and tiles.

Obvious modifications such as blending of the asphalt composition of the invention with mineral aggregates, cement, sand, asbestos, vermiculite, fiber glass and the like are included in the scope of the invention.

We claim:
1. As a new composition, a mixture of asphalt and atactic polypropylene having a molecular weight of from about 17,000 to about 25,000 obtained from the stereo-specific polymerization of propylene, the content of atactic polypropylene in the mixture being in the range of 1–20% by weight and such that the penetration @ 77° F. is in the range of 70–120 and the penetration ratio is at least 30.

2. A method for improving the penetration specifications of asphalt comprising blending therewith from 1 to 20 weight percent atactic polypropylene recovered from the stereo-specific polymerization of propylene.

3. A method for improving the penetration specifications of asphalt to achieve paving grade comprising blending therewith from 1 to 20 weight percent atactic polypropylene recovered from the stereo-specific polymerization of propylene.

4. A method for improving the penetration specifications of asphalt to achieve a penetration in the range of 70 to 120 at 77° F. and a penetration ratio of at least 30.0 comprising blending with the asphalt from 1 to 20 weight percent atactic polypropylene recovered from the stereo-specific polymerization of propylene.

5. A composition comprising 1 to 20 weight percent atactic polypropylene and 80–99 weight percent asphalt.

6. A composition consisting essentially of 80–99 weight percent asphalt and 1–20 weight percent atactic polypropylene having a molecular weight of from about 10,000 to about 40,000.

References Cited in the file of this patent

UNITED STATES PATENTS

| | | |
|---|---|---|
| 2,834,742 | Scott et al. | May 13, 1958 |
| 2,871,212 | Thayer | Jan. 27, 1959 |
| 2,909,498 | Sayko | Oct. 20, 1959 |
| 2,969,344 | Dobson et al. | Jan. 24, 1961 |
| 2,972,608 | Coover et al. | Feb. 21, 1961 |
| 2,980,664 | Stuart | Apr. 18, 1961 |
| 3,036,900 | Honeycutt | May 29, 1962 |

OTHER REFERENCES

Journal of American Chemical Society, Crystalline High Polymers of Olefins, vol. 77, p. 1708, March 31, 1955.